United States Patent [19]
Brodt et al.

[11] Patent Number: 5,756,637
[45] Date of Patent: May 26, 1998

[54] POLYMERIC MATERIALS SUITABLE AS DISPERSING RESINS

[75] Inventors: Gregor Brodt, Heppenheim; Josef Schelble, Offenburg; August Lehner, Rödersheim-Gronau; Franz Weingart, Leimen; Albert Kohl, Laumersheim; Ria Kress, Ludwigshafen; Norbert Schneider, Altrip, all of Germany

[73] Assignee: Emtech Magnetics GmbH, Ludwigshafen, Germany

[21] Appl. No.: 643,587

[22] Filed: May 6, 1996

[51] Int. Cl.$^6$ .................................. C08G 18/62
[52] U.S. Cl. .................. 528/71; 528/59; 528/72; 528/75; 528/49; 428/694 B; 428/694 BU; 428/694 BL; 428/900; 428/694 BG; 525/123; 252/62.54
[58] Field of Search .................. 528/59, 71, 75, 528/49, 72; 428/694 B, 694 BU, 694 BL, 900, 694 BG; 525/123; 252/62.54

[56] References Cited

U.S. PATENT DOCUMENTS 4,795,796  1/1989  Haubennestel ........................ 528/28

FOREIGN PATENT DOCUMENTS

| 33 900 | 8/1981 | European Pat. Off. . |
| 547 432 | 6/1993 | European Pat. Off. . |
| 592 905 | 4/1994 | European Pat. Off. . |
| 44 33 931 | 4/1995 | Germany . |
| 1 339 930 | 12/1973 | United Kingdom . |
| 2 285 985 | 8/1995 | United Kingdom . |

OTHER PUBLICATIONS

Derwent Publ. Abst. JP 57 092 422 Nov., 1980.
Ulmann's Enc. Ind. Chem. 5 Ed. vol. 20, pp. 243–369, 1992.
H. Fikentscher, Celluslose–Chemi 13(3), (1932), pp. 58–64.

*Primary Examiner*—Rachel Gorr
*Attorney, Agent, or Firm*—Keil & Weinkauf

[57] ABSTRACT

A polymeric material I is obtainable by reacting 1) a polymer II of
   a) from 80 to almost 100 mol % of a $C_1$–$C_{25}$-alkyl ester of an $\alpha,\beta$-unsaturated carboxylic acid,
   b) from 0 to 20 mol % of one or more further monomers and
   c) an initiator and/or regulator by means of which the majority of the polymer chains of the polymer II are terminated at one of their ends by a hydroxyl group, 2) with a polyfunctional nonaromatic isocyanate III to give a reaction product IV, the amount of isocyanate groups being from 1.2 to 3.9 mol per mole of the hydroxyl groups in II, 3) reacting IV with
   a) a compound V, containing groups reactive toward isocyanates, to give a reaction product VI, the amount of reactive groups being from 2 to 7 mol per mole of the free isocyanate groups still present in IV, and
   reacting VI with a compound VII to give the polymer I, which reacts with the reactive groups which are still free in VI and by means of which acidic groups are introduced into VI, or
   b) a compound VIII which contains groups reactive toward isocyanates and by means of which the acidic groups are introduced into IV, to give the polymer I.

The polymeric materials can be used as dispersing resin for pigment-containing coatings, in particular for the production of magnetic recording materials.

15 Claims, No Drawings

POLYMERIC MATERIALS SUITABLE AS DISPERSING RESINS

The present invention relates to polymeric materials I which are suitable as dispersing resins and are obtainable by reacting 1) a polymer II of
   a) from 80 to almost 100 mol % of a $C_1$–$C_{25}$-alkyl ester of an α,β-unsaturated carboxylic acid,
   b) from 0 to 20 mol % of one or more further monomers and
   c) an initiator and/or regulator by means of which the majority of the polymer chains of the polymer II are terminated at one of their ends by a hydroxyl group,
2) with a polyfunctional nonaromatic isocyanate III to give a reaction product IV, the amount of isocyanate groups being from 1.2 to 3.9 mol per mole of the hydroxyl groups of II,
3) reacting IV with
   a) a compound V, containing groups reactive toward isocyanates, to give a reaction product VI, the amount of reactive groups being from 2 to 7 mol per mole of the free isocyanate groups still present in IV, and
   reacting VI with a compound VII to give the polymer I, which reacts with the reactive groups which are still free in VI and by means of which acidic groups are introduced into VI,
   or
   b) a compound VIII which contains groups reactive toward isocyanates and by means of which the acidic groups are introduced into IV, to give the polymer I.

The present invention furthermore relates to a process for the preparation of the polymeric materials I, their use as dispersing resins for pigment-containing coatings, pigment formulations comprising a pigment and a polymeric material I and magnetic recording materials containing magnetic pigments which are treated with the polymeric materials I as dispersing resin.

Aqueous and organic suspensions which contain a colored or magnetic pigment and a binder are widely used for the production of colored or magnetic coatings (Ullmann's Encyclopedia of Industrial Chemistry, 5th Ed., Vol. 20, pages 243–369, VCH Publishers Inc., Weinheim-New York, 1992).

In such suspensions, the pigment should as a rule be, and remain, very finely divided; furthermore, it should be capable of being rapidly dispersed and in addition the suspensions should remain stable. Since these requirements generally cannot be met using pure pigments, it is advantageous first to convert the pure pigments into a corresponding suitable form for use, these generally being pigment formulations containing a dispersing resin.

Suitable dispersing resins are in principle polymers having acidic or basic groups. In particular, inorganic pigments, such as magnetic pigments, accumulate at these anchor groups so that the organophilic parts of the resin molecules project outward and thus make the pigment particles compatible with the binder in which they are embedded.

The prior German Application P 4333292.7 proposed, as dispersing resins, polymers which essentially correspond to the abovementioned reaction product VI.

It is an object of the present invention to provide dispersing resins by means of which in particular stable formulations of organic pigments, such as magnetic pigments, can be prepared.

We have found that this object is achieved by the polymeric materials I defined at the outset, a process for their preparation, pigment formulations comprising a pigment and a polymeric material I, and magnetic recording materials which contain magnetic pigments which are treated with a polymeric material I.

Suitable monomers (a) of which the polymers II are for the most part composed are primarily esters of α,β-unsaturated carboxylic acids of the formula

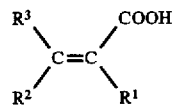

where $R^1$, $R^2$ and $R^3$ are each hydrogen or $C_1$–$C_4$-alkyl, acrylic acid and methacrylic acid being preferred. Mixtures of esters of different carboxylic acids of this type may also be used.

Suitable alcohol components of the alkyl esters, in addition to the $C_9$–$C_{25}$-alkanols, such as nonanol, stearyl alcohol and lauryl alcohol, are preferably the $C_1$–$C_8$-alkanols, in particular methanol and n-butanol, and mixtures of different alcohols of this type.

Suitable further comonomers (b) for the synthesis of the polymers II comprise up to 20, preferably from 0 to 5, mol % of monomers by means of which the mechanical, thermal and chemical properties of the polymers composed only of the monomers (a) are modified but not substantially changed.

Such monomers are, for example, olefinically unsaturated aromatic hydrocarbons, such as styrene and α-methylstyrene, unsaturated nitriles, such as acrylonitrile and methacrylonitrile, halogenated olefins, such as vinyl chloride, vinyl alcohol derivatives, such as vinyl acetate, and in particular monoesters of the stated α,β-unsaturated carboxylic acids with polyhydric alcohols, such as ethanediol, propane-1,2-diol, propane-1,3-diol, the butanediols, glycerol and mixtures of these alcohols.

Small amounts of bifunctional monomers by means of which slight crosslinking of the polymers is effected without influencing their properties as thermoplastics are also suitable, for example butadiene, divinylbenzene and the polyesters of α,β-unsaturated carboxylic acids with the abovementioned polyhydric alcohols.

According to the invention, the polymer chains of II should be terminated with a hydroxyl group. This is achieved using initiators which decompose to give a hydroxyl radical (.OH radical) and/or by means of regulators which contain a hydroxyl function.

Initiators of this type are, for example, tert-butyl hydroperoxide, tetrahydrofuran hydroperoxide, cumene hydroperoxide or 2,2'-azobis(2-methyl-N-(2-hydroxyethyl) propionamide).

If the hydroxyl group is introduced only via a regulator, other initiators may also be used, for example azobisisobutyronitrile, di-tert-butyl peroxide, didodecanoyl peroxide, dibenzoyl peroxide, tert-butyl peracetate or tert-butyl 2-methylperpropionate.

Suitable regulators are amino alcohols, aminophenols and in particular thioalkanols, such as 3-hydroxypropanethiol, 2-hydroxyethyl-3-mercaptopropionates and especially 2-hydroxyethanethiol (mercaptoethanol).

Mixtures of different initiators and/or regulators may also be used.

Initiators and regulators are used in the conventional amounts, as a rule from 0.1 to 4.8% by weight and from 0.1 to 5% by weight, respectively, based on the mixture of the monomers (a) and (b) which is used. Since the amount of those terminal groups of the polymer chains which originate from the initiators or regulators is only from about 0.05 to 5 mol %, for the sake of clarity these amounts are not considered when specifying the quantitative composition of the polymer II.

The polymers II can be prepared by all known polymerization methods, for example by mass polymerization, emulsion polymerization and, preferably, solution polymerization.

Suitable solvents are esters, such as ethyl acetate, hydrocarbons, such as toluene, and in particular cyclic ethers, such as tetrahydrofuran and dioxane.

The polymerization is carried out as a rule at elevated temperatures, preferably at from 40° to 125° C., resulting in reaction times of from 2 to 7 hours.

The polymers II can be isolated from the reaction mixture by known methods, for example by extraction or precipitation, or can preferably be used without isolation for further processing.

For the preparation of the reaction products IV, a polymer II is reacted with a polyfunctional nonaromatic isocyanate III or with a mixture of such isocyanates, the amount of isocyanate groups being from 1.2 to 3.9, preferably from 2.0 to 3.2, mol per mole of hydroxyl groups of II. The amount of hydroxyl groups in the prepared polymer II corresponds as a rule to a hydroxyl number of from 10 to 20 mg of KOH/g of II (according to DIN 53240), which in turn corresponds to from 0.17 to 0.36 mmol of hydroxyl groups per gram of II.

Polyfunctional, nonaromatic isocyanates which can advantageously be used are open-chain isocyanates, such as 1,6-diisocyanatohexane, cyclic isocyanates, such as 1,3-di(isocyanatomethyl)cyclohexane, oligomeric urea derivatives carrying free isocyanate groups, for example reaction products of 3 mol of 1,6-diisocyanatohexane and 1 mol of water, or oligomeric urethanes carrying free isocyanate groups.

The preparation of IV by reacting II with III can advantageously be carried out in the solvents suitable for the preparation of II.

The reaction can be carried out without a catalyst or preferably in the presence of a catalyst, such as a tertiary amine, in particular triethylamine, a metal salt, in particular tin octoate or lead octoate, or an organometallic compound, in particular dibutyltin dilaurate or titanium tetramethoxide.

The reaction is carried out as a rule at elevated temperatures, preferably at from 60° to 125° C., corresponding to reaction times of from about 0.2 to 5 hours.

The reaction products IV can be isolated from the reaction mixture by known methods, for example extraction or precipitation, or can preferably be used without isolation for further processing.

For the preparation of the reaction products VI, the reaction product IV is reacted with a compound V containing groups reactive toward isocyanates, or a mixture of such compounds, the amount of reactive groups being from 2 to 7, preferably from 2 to 4, mol per mole of the free isocyanate groups still present in IV. The number of free isocyanate groups can be determined according to DIN EN 1242.

Suitable groups reactive toward isocyanates include many classes of substances, for example mercaptans, alcohols or amines. Compounds V which contain a plurality of identical or different groups of this type may be used.

As generally known, examples of such compounds are mercaptans, such as 1,2-thioglycol, thioalcohols, such as 2-mercaptoethanol, thioamines, such as (2-mercaptoethyl) methylamine, alcohols, such as 1,2-propanediol, glycerol, 2,2-di(hydroxymethyl)-1-butanol, amino alcohols, such as aminoethanol, N-methylaminoethanol, 4-(3-aminopropyl)benzyl alcohol or N-(3-hydroxypropyl)piperidine, or polyfunctional, in particular nonaromatic, amines.

Polyfunctional, nonaromatic amines which can advantageously be used are open-chain amines, such as ethylenediamine, diethylenetriamine, in particular triethylenetetramine, or cyclic amines, such as piperazines or 4-aminopiperidines, in particular 2,2,5,5-tetramethyl-4-aminopiperidine, or polycyclic amines.

Such amines are generally known.

Amines of the formula

where x is from 2 to 6, or of the formula

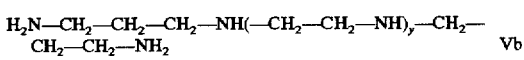

where y is from 0 to 4, have proven particularly advantageous.

The compounds Va are obtainable in a manner known per se by oligomerization of ethyleneimine in the presence of ammonia, and the compounds Vb can be prepared by reacting 2 mol of acrylonitrile with 1 mol of ammonia or a compound Va and subsequently hydrogenating the nitrile functions.

The reaction can be carried out in the presence of catalysts, such as a tertiary amine, in particular tributylamine or 1,4-diazabicyclo[2.2.2]octane, or an organometallic compound, in particular dibutyltin dilaurate, in amounts of from 1 to 500, in particular from 1 to 50, ppm by weight, based on IV, or preferably in the absence of a catalyst.

The preparation of VI by reacting IV with V can be carried out in the absence of a solvent or, advantageously, in the presence of an organic solvent, such as a hydrocarbon, in particular toluene or cyclohexane, an ester, in particular ethyl acetate, an ether, in particular diisopropyl ether or methyl tert-butyl ether, or preferably a cyclic ether, in particular tetrahydrofuran or dioxane.

Water is also suitable in some cases.

The reaction is carried out as a rule at from 10° to 70° C., preferably from 20° to 40° C., resulting in reaction times of from about 0.1 to 2 hours.

The reaction products VI can be isolated from the reaction mixture by known methods, for example by extraction or precipitation, or can preferably be used without isolation for further processing.

For the preparation of the polymers I, the reaction product VI is reacted with a compound VII, which reacts with the reactive groups in VI which are still free and by means of which acidic groups are introduced into VI, or mixtures of such compounds. The number of free reactive groups can be determined according to DIN 53176 in the case of the amino groups and according to DIN 53240 in the case of the hydroxyl groups.

Many classes of substances, for example alkyl halides, amides, epoxides, esters, ketones or isocyanates, which carry in the molecule one or more acidic groups or groups which are readily converted into acidic groups can be used as substances VII which react with the reactive groups.

Acidic groups are in particular sulfonic acid groups, phosphonic acid groups, phosphoric acid groups and especially carboxyl groups.

Examples of such compounds are alkyl halides, such as chloroacetic acid, amides, such as the monoamide of succinic acid, epoxides, such as glycidic acid, esters, such as monomethyl phthalate, or ketones, such as acetylacetic acid.

Particularly suitable compounds VII are the internal anhydrides of polybasic carboxylic acids, such as maleic anhydride, succinic anhydride, phthalic anhydride and adipic anhydride, which, for example, react with amino groups of VI to form amido groups, which are substituted by a carbonyl group.

In the case of hydroxyl groups as reactive groups, inorganic acids, in particular mineral acids, such as phosphoric acid, and the oligomers and polymers of such acids, or derivatives, such as esters or salts of such acids, by means of which acidic groups are introduced into the compound VI, or mixtures of such compounds can also advantageously be used as the compound V, in addition to the stated carboxylic acids and carboxylic acid derivatives.

These compounds can be reacted in a manner known per se with the reactive groups of the polymers VI.

The preparation of I by reacting VI with VII can be carried out the absence of a solvent or, advantageously, in the presence of an organic solvent, such as a hydrocarbon, in particular toluene, cyclohexane or hexane, an ester, in particular ethyl acetate, an ether, in particular diisopropyl ether or methyl tert-butyl ether, or preferably a cyclic ether, in particular tetrahydrofuran or dioxane. In some cases, water is also suitable.

The reaction is carried out as a rule at from 10° to 60° C., preferably from 20° to 40° C., resulting in reaction times of from about 0.1 to 1.5 hours.

In the case of the use of inorganic acids, in particular mineral acids, such as phosphoric acid and sulfuric acid, and the oligomers and polymers of such acids, or of derivatives, such as esters or salts of such acids, by means of which acidic groups are introduced into the compound VI, or mixtures of such compounds as the compound V, the reaction can be carried out as described or, advantageously, in a manner known per se in the presence of a solvent which forms an azeotropic mixture with water. Examples of suitable solvents of this type are aromatics, such as benzene or toluene. Mixtures of such solvents can also be used.

The reaction is carried out as a rule at the boiling point established under the corresponding pressure, resulting in reaction times of from about 1 to 10 hours.

The polymer I can be isolated from the reaction mixture by known methods, for example extraction or precipitation. However, the reaction mixture is preferably used directly for the preparation of the pigment formulations.

For the preparation of the polymer I, the compound IV can be reacted according to the invention with a compound VIII which has at least one group reactive toward isocyanates and carries in the molecule one or more acidic groups or groups which can readily be converted into acidic groups. Mixtures of different compounds VIII may also be used.

Suitable compounds having groups which are reactive toward isocyanates include many classes of substances, for example mercaptans, alcohols or amines. Compounds V which contain a plurality of identical or different groups of this type may also be used.

Acidic groups are in particular the sulfonic acid group, phosphonic acid group, phosphoric acid group and especially the carboxyl group. Groups which are readily converted into acidic groups are, for example, the ester group or salts, preferably of the alkali metals, such as sodium or potassium.

Examples of such compounds VIII are hydroxy carboxylic acids, such as citric acid, hydroxymethylsuccinic acid, 6-hydroxycaproic acid or 12-hydroxydodecanoic acid, amino carboxylic acids, such as aminovaleric acid, mercapto carboxylic acids, such as mercaptosuccinic acid, phosphoric acid derivatives, preferably hydroxyalkyl phosphates, such as mono(2,2-bis(hydroxymethyl)butyl) phosphate, or oligoethylene glycol phosphates, aminoalkyl phosphates, such as the sodium salt of mono(2-aminoethyl) phosphate, phosphonic acid derivatives, preferably hydroxyalkylphosphonates, such as diethyl N,N-bis(2-hydroxyethyl) aminoethylphosphonate, aminoalkylphosphonates, such as diethyl 3-aminopropylphosphonate, or sulfonic acid derivatives, preferably hydroxy sulfonic acids, such as 3-hydroxypropanesulfonic acid, or amino sulfonic acids, such as N-methyltaurine.

The reaction can be carried out in the presence of catalysts, for example a tertiary amine, such as tributylamine or 1,4-diazabicyclo[2.2.2]octane, or, for example, an organometallic compound, such as dibutyltin dilaurate, in amounts of from 1 to 500, in particular from 1 to 50, ppm by weight, based on IV, or preferably in the absence of a catalyst.

The preparation of I by reacting IV with VIII can be carried out in the absence of a solvent or, advantageously, in the presence of an organic solvent. Suitable solvents are hydrocarbons, in particular toluene and cyclohexane, esters, in particular ethyl acetate, ethers, in particular diisopropyl ether and methyl tert-butyl ether, and preferably cyclic ethers, in particular tetrahydrofuran or dioxane.

Water is also suitable in some cases.

The reaction is carried out as a rule at from 10° to 70° C., preferably from 20° to 60° C., resulting in reaction times of from about 0.1 to 2 hours.

In accordance with their stepwise preparation, the novel polymers I consist of an organophilic polymeric main chain which is multiply branched at one of its ends, a plurality of the outermost branches carrying acidic groups. These acidic groups have a strong affinity to a large number of pigments, in particular inorganic oxide pigments, and therefore accumulate at their surface. Consequently, pigment formulations having an organophilic covering are obtained from the pigments and polymers I by conventional thorough mixing.

For the preparation of the pigment formulations, the pigments, in particular colored and magnetic pigments, are mixed with the polymeric materials I and, if required, additives in a manner known per se, in the absence or, preferably, in the presence of an organic diluent. Suitable diluents are hydrocarbons, in particular toluene and cyclohexane, ketones, in particular methyl ethyl ketone and cyclohexanone, esters, in particular ethyl acetate, and ethers, in particular tetrahydrofuran and dioxane. Water is also suitable in some cases.

The pigment formulation may be isolated from the mixture by removing the diluent or can preferably be used without isolation for further processing.

The pigment formulations can be incorporated into organic binders conveniently and without undesirable agglomeration.

For this purpose, the pigment formulations can be mixed in a manner known per se with a binder and, if required, additives, in the absence or, preferably, in the presence of an organic diluent. Suitable organic diluents are hydrocarbons, in particular toluene, cyclohexane and n-alkanes, ketones, in particular methyl ethyl ketone, cyclohexanone and methyl isobutyl ketone, esters, in particular ethyl acetate, and ethers, in particular tetrahydrofuran and dioxane.

Suitable binders are known to be polyurethanes, polyacrylates, polymethacrylates, polyacrylamide, vinyl polymers, such as polystyrene, polyvinyl chloride, polyvinyl acetate, polyvinyl propionate and polyacrylonitrile, cellulose-containing binders, such as cellulose esters, in particular cellulose nitrates, cellulose acetates, cellulose acetopropionate and cellulose acetobutyrate, phenoxy resins and epoxy resins.

Fillers, such as inorganic and organic pigments, for example alumina, silica, titanium dioxide, carbon black, polyethylene or polypropylene, chalking inhibitors, eg. antimony oxide, thixotropic substances, for example amorphous silica, are known to be used as additives.

The mixtures comprising pigment formulation, binder and, if required, additives or solvents are used in a conventional manner as coating materials.

The coating material may contain the novel pigment formulations alone or as a mixture with other pigments or pigment formulations.

Such coating materials are particularly important in the production of magnetic recording materials. For this purpose, pigment formulations comprising a magnetic pigment and polymeric material I can be dispersed, if necessary with fillers, in a manner known per se in a mixture comprising a solvent or diluent, a binder and further additives, such a lubricant, and can be applied to a nonmagnetic substrate. After orientation of the ferromagnetic pigments in a strong magnetic field, the further processing can be carried out in the usual manner, for example by removing the solvent and, if the binder is crosslinkable, curing the binder with final calendering.

Suitable magnetic pigments are the usual oxide pigments, such as $\gamma$—$Fe_2O_3$, $\gamma$—$Fe_3O_4$ and $CrO_2$, or metallic pigments, such as Fe, Co and Ni. As is generally known, these pigments may contain further chemical elements or compounds.

As usual, the solvents or diluents used may be water, ethers, such as tetrahydrofuran or dioxane, ketones, such as methyl ethyl ketone or cyclohexanone, esters, such as ethyl acetate, or hydrocarbons, such as alkanes or aromatics, or mixtures of such compounds.

The lubricants usually used are carboxylic acids of 10 to 20 carbon atoms, in particular stearic acid or palmitic acid, or derivatives of carboxylic acids, such as their salts, esters and amides.

The nonmagnetic and nonmagnetizable substrates used may be the conventional rigid or flexible substrates, in particular films of linear polyesters, such as polyethylene terephthalate, which are generally from 4 to 200 µm, in particular from 6 to 36 µm, thick.

In the production of magnetic recording materials, pigment mixtures comprising a nonmagnetic pigment and a polymeric material I, if necessary with the additives described for magnetic coatings, may be applied in the manner described in order to produce nonmagnetic layers, such as intermediate layers, backing coatings and top layers.

Suitable nonmagnetic pigments are, as usual, alumina, carbon black, silica, titanium dioxide, nonmagnetic chromium oxides and zirconium oxide.

In the production of magnetic recording materials, a plurality of magnetic layers, at least one of which contains a novel pigment formulation, or a plurality of nonmagnetic layers, at least one of which contains a novel pigment formulation, can be applied to the substrate.

EXAMPLE 1

1) Preparation of a Polymeric Material I

A mixture of 424 g of methyl methacrylate, 424 g of n-butyl methacrylate, 17.6 g of mercaptoethanol and 2.1 g of azobisisobutyronitrile was added to 466 g of tetrahydrofuran (abbreviated below to THF) in the course of 2 hours at the boiling point (67° C.). Stirring was continued for a further 30 minutes at 67° C., after which the polymerization was completed in the course of 2 hours with a further 3.5 g of the initiator, which was dissolved in 41 g of THF. The polymer II thus obtained contained 0.26 mmol of hydroxyl groups per gram of substance.

A solution of 90 g of THF, 0.7 g of hexamethylene diisocyanate, 86 g of the biuret of hexamethylene diisocyanate and 42 g of a polyfunctional isocyanate having on average 4.8 isocyanate groups per mole was then added to the polymer solution in the course of 15 minutes at 67° C. After 30 minutes, 0.4 g of dibutyltin dilaurate was added to the mixture, which was kept at 67° C. for a further 4 hours. The reaction product IV thus obtained still contained 0.38 mmol of free isocyanate groups per gram of substance.

A solution of 625 g of THF and 65.4 g of N,N'-bis(3-amino-n-propyl)ethylenediamine was added to the reaction mixture at 25° C., the isocyanate groups reacting in the course of 1 hour. The reaction product VI thus obtained contained 1.04 mmol of free amino groups per gram of substance, which were converted into maleamic acid groups with 107 g of maleic anhydride.

The polymer I thus obtained had a K value of about 22, measured in 1% strength solution in dimethylformamide. The K value was determined according to H. Fikentscher, Cellulose-Chemie 13(3) (1932), 58–64.

The acid number of the polymer I (determined according to DIN 53402) was 32.

2) Preparation of a Coating Material 5.09 g of polymer I, 1.53 g of a commercial polyurethane elastomer based on a polyesterol, a short-chain alkanediol and 4,4'-diisocyanatodiphenylmethane, 0.43 g of stearic acid and 42.5 g of a pure iron pigment were dispersed in 106.24 g of THF for 16 hours in a ball mill using ceramic balls as the grinding medium.

A solution of 3.57 g of the stated polyurethane elastomer in 20.23 g of THF was then added and dispersing was continued for a further 2 hours.

The dispersion was filtered under pressure to remove the balls.

3) Production of a Magnetic Recording Material

The dispersion was applied to a 24 µm thick polyethylene terephthalate film by means of a 40 µm knife coater at a takeoff speed of 1 m/s.

After orientation of the magnetic pigments, the film was dried at 80° C., calendered (70° C., 200 kg/cm) and slit into 3.81 mm wide tapes.

The tapes had excellent magnetic properties.

4) Measurement of the Stability of the Dispersion

In order to measure the stability of the dispersion, a 250 ml bottle charged with 200 ml of dispersion was placed on a roller stand (manufacturer: Alfred Schwinherr, Schwäbisch Gmünd) for 24 hours.

Freshly prepared dispersion and the stored dispersion were applied with a manual knife coater to a polyethylene terephthalate film having an average peak-to-valley height of from 40 to 50 nm.

The average peak-to-valley height is the arithmetic mean of the deviations of the surface irregularities from the mean surface height and as such is a measure of the surface roughness.

A gloss of 133 was measured for the freshly prepared dispersion, and a gloss of 130 for the stored dispersion.

The gloss measurement was carried out using a Dr. Lange reflectometer (manufacturer: Erichsen GmbH & Co. KG, Hemer-Sundwig), according to the operating instructions, at an angle of 60°. The higher the gloss, the better the dispersing.

EXAMPLE 2

1) Preparation of a Polymeric Material I

A reaction mixture containing the reaction product IV was prepared according to Example 1.

A solution of 73.0 g of citric acid in 308 g of THF was added to the reaction mixture at 59° C., the isocyanate groups reacting in the course of 1 hour.

The polymer I thus obtained had a K value of about 19, measured in 1% strength solution in dimethylformamide.

2) Preparation of a Coating Material

The binder was prepared using the polymer as described in Example 1.

3) Production of a Magnetic Recording Material

A magnetic recording material was produced as described in Example 1.

The tapes had excellent magnetic properties.

4) Measurement of the Stability of the Dispersion

A gloss of 135 was measured for the freshly prepared dispersion and a gloss of 128 for the stored dispersion.

EXAMPLE 3

1) Preparation of a Polymeric Material I

A reaction mixture containing the reaction product IV was prepared according to Example 1.

A solution of 415.4 g of a sodium sulfonate-containing ethoxylate/propoxylate (Tegomer DS 3117 from Goldschmidt AG, Essen) in 295 g of THF was added to the reaction mixture at 59° C., the isocyanate groups reacting in the course of 1 hour.

The polymer I thus obtained had a K value of about 23, measured in 1% strength solution in dimethylformamide.

2) Preparation of a Coating Material

The binder was prepared using the polymer as described in Example 1.

3) Production of a Magnetic Recording Material

A magnetic recording material was produced as described in Example 1. The tapes had excellent magnetic properties.

4) Measurement of the Stability of the Dispersion

A gloss of 128 was measured for the freshly prepared dispersion and a gloss of 120 for the stored dispersion.

EXAMPLE 4

1) Preparation of a Polymeric Material I

A reaction mixture containing the reaction product IV was prepared according to Example 1.

A solution of 79.1 g of diethyl N,N-bis(2-hydroxyethyl) aminomethylphosphonate in 295 g of THF was added to the reaction mixture at 59° C., the isocyanate groups reacting in the course of 1 hour.

The polymer I thus obtained had a K value of about 19, measured in 1% strength solution in dimethylformamide.

2) Preparation of a Coating Material

The binder was prepared using the polymer as described in Example 1.

3) Production of a Magnetic Recording Material

A magnetic recording material was produced as described in Example 1.

The tapes had excellent magnetic properties.

4) Measurement of the Stability of the Dispersion

A gloss of 135 was measured for the freshly prepared dispersion and a gloss of 129 for the stored dispersion.

EXAMPLE 5

1) Preparation of a Polymeric Material I

A reaction mixture containing the reaction product IV was prepared according to Example 1.

A solution of 66.4 g of mono(2,2-bis(hydroxymethyl) butyl) phosphate in 98 g of THF was added to the reaction mixture at 59° C., the isocyanate groups reacting in the course of 1 hour.

The polymer I thus obtained had a K value of about 18, measured in 1% strength solution in dimethylformamide.

2) Preparation of a Coating Material

The binder was prepared using the polymer as described in Example 1.

3) Production of a Magnetic Recording Material

A magnetic recording material was produced as described in Example 1.

The tapes had excellent magnetic properties.

4) Measurement of the Stability of the Dispersion

A gloss of 135 was measured for the freshly prepared dispersion and a gloss of 135 for the stored dispersion.

EXAMPLE 6

1) Preparation of a Polymeric Material I

A reaction mixture containing the reaction product IV was prepared according to Example 1.

A solution of 23.3 g of (methylamino)ethanol in 150 g of THF was added to the reaction mixture at 59° C., the isocyanate groups reacting in the course of 1 hour. 33.4 g of phosphoric acid were then added to the mixture, which was kept at 70° C. for a further 8 hours.

The polymer I thus obtained had a K value of about 17, measured in 1% strength solution in dimethylformamide.

2) Preparation of a Coating Material

The binder was prepared using the polymer as described in Example 1.

3) Production of a Magnetic Recording Material

A magnetic recording material was produced as described in Example 1.

The tapes had excellent magnetic properties.

4) Measurement of the Stability of the Dispersion

A gloss of 148 was measured for the freshly prepared dispersion and a gloss of 138 for the stored dispersion.

We claim:

1. A polymeric material I which is suitable as a dispersing resin and is obtained by reacting
   1) a polymer II of
      a) from 80 to almost 100 mol % of a $C_1$–$C_{25}$-alkyl ester of an α,β-unsaturated carboxylic acid,
      b) from 0 to 20 mol % of one or more further monomers and
      c) an initiator or regulator by means of which the majority of the polymer chains of the polymer II are terminated at one of their ends by a hydroxyl group,
   2) with a poly-functional non-aromatic isocyanate III to give a reaction product IV, the amount of isocyanate groups being from 1.2 to 3.9 mol per mole of the hydroxyl groups of II, 3) reacting the reaction product IV with a compound V, containing groups reactive toward isocyanates, to give a reaction product VI, the amount of reactive groups being from 2 to 7 mol per mole of the free isocyanate groups still present in IV, and reacting the reaction product VI with a compound VII which reacts with the reactive groups which are still free in VI and by means of which one or more acidic groups or groups which are readily converted into acidic groups are introduced into VI, to give the polymer I.

2. A polymeric material as defined in claim 1, obtained from an internal anhydride of polybasic carboxylic acid as compound VII.

3. A polymeric material as defined in claim 2, obtained from maleic anhydride, succinic anhydride, phthalic anhydride or adipic anhydride as compound VII.

4. A polymeric material as defined in claim 1, obtained from a non-aromatic poly-functional amine as compound V.

5. A polymeric material as defined in claim 1, obtained from a poly-functional amine of the formula

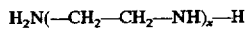

where x is from 2 to 6, or of the formula

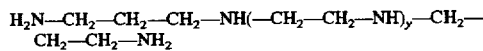

where y is from 0 to 4, as compound V.

6. A process for the preparation of a polymeric material I as defined in claim 1, which comprises reacting 1) a polymer II of
   a) from 80 to almost 100 mol % of a $C_1$–$C_{25}$-alkyl ester of an $\alpha,\beta$-unsaturated carboxylic acid,
   b) from 0 to 20 mol % of one or more further monomers and
   c) an initiator or regulator by means of which the majority of the polymer chains of the polymer II are terminated at one of their ends by a hydroxyl group, 2) with a poly-functional non-aromatic isocyanate III to give a reaction product IV, the amount of isocyanate groups being from 1.2 to 3.9 mol per mole of the hydroxyl groups in II, 3) reacting the reaction product IV with
   a compound V, containing groups reactive toward isocyanates, to give a reaction product VI, the amount of reactive groups being from 2 to 7 mol per mole of the free isocyanate groups still present in IV, and
   reacting the reaction product VI with a compound VII which reacts with the amino groups which are still free in VI and by means of which one or more acidic groups or groups which are readily converted into acidic groups are introduced into VI to give the polymer.

7. A pigment formulation comprising a pigment and a polymeric material as defined in claim 1.

8. A pigment formulation as defined in claim 7, in which the pigment is a magnetic pigment.

9. A magnetic recording material containing a magnetic pigment which is treated with a polymeric material as defined in claim 1 as a dispersing resin.

10. A polymeric material I which is suitable as a dispersing resin and is obtained by reacting
   1) a polymer II of
      a) from 80 to almost 100 mol % of a $C_1$–$C_{25}$-alkyl ester of an $\alpha,\beta$-unsaturated carboxylic acid,
      b) from 0 to 20 mol % of one or more further monomers and
      c) an initiator or regulator by means of which the majority of the polymer chains of the polymer II are terminated at one of their ends by a hydroxyl group,
   2) with a poly-functional non-aromatic isocyanate III to give a reaction product IV, the amount of isocyanate groups being from 1.2 to 3.9 mol per mole of the hydroxyl groups of II,
   3) reacting the reaction product IV with a compound VIII which contains at least one group reactive toward isocyanates and by means of which one or more phosphonic acid ester groups or phosphoric acid ester groups are introduced into IV, to give the polymer I.

11. A polymeric material as defined in claim 1, obtained from N-methylaminoethanol as compound V.

12. A process for the preparation of a polymeric material I as defined in claim 10, which comprises reacting
   1) a polymer II of
      a) from 80 to almost 100 mol % of a $C_1$–$C_{25}$-alkyl ester of an $\alpha,\beta$-unsaturated carboxylic acid,
      b) from 0 to 20 mol % of one or more further monomers and
      c) an initiator or regulator by means of which the majority of the polymer chains of the polymer II are terminated at one of their ends by a hydroxyl group,
   2) with a poly-functional non-aromatic isocyanate III to give a reaction product IV, the amount of isocyanate groups being 1.2 to 3.9 mol per mole of the hydroxyl groups in II,
   3) reacting the reaction product IV with a compound VIII which contains at least one group reactive toward isocyanates and by means of which one or more phosphonic acid ester groups or phosphoric acid ester groups are introduced into IV, to give the polymer I.

13. A pigment formulation comprising a pigment and a polymeric material as defined in claim 10.

14. A magnetic recording material containing a magnetic pigment which is treated with a polymeric material as defined in claim 10 as a dispersing resin.

15. The pigment formulation of claim 13 wherein the pigment is a magnetic pigment.

* * * * *

UNITED STATES PATENT AND TRADEMARK OFFICE
CERTIFICATE OF CORRECTION

PATENT NO. : 5,756,637
DATED : May 26, 1998
INVENTOR(S) : Brodt, et. al.

It is certified that error appears in the above-identified patent and that said Letters Patent is hereby corrected as shown below:

Column 11, claim 6, last line, after "polymer" insert --I--.

Signed and Sealed this

Twentieth Day of October, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.: 5,756,637

DATED: May 26, 1998

INVENTOR(S): BRODT et al.

It is certified that error appears in the above-identified patent and that said Letters Patent is hereby corrected as shown below:

On the cover page, item [73], "Emtech Magnetics GmbH" should be
--EMTEC Magnetics GmbH--.

On the cover page, insert the following foreign priority information:

--[30] Foreign Application Priority Data
May 11, 1995   [DE]   Germany .................. 195 16 784.3--.

On the cover page, in the abstract, line 13, "in" should be --of--;
line 27, "resin" should be --resins--.

Signed and Sealed this

Twenty-sixth Day of January, 1999

Attest:

*Acting Commissioner of Patents and Trademarks*

*Attesting Officer*